United States Patent
Ahn et al.

(10) Patent No.: US 7,660,484 B2
(45) Date of Patent: Feb. 9, 2010

(54) APPARATUS FOR REMOVING FALSE CONTOUR AND METHOD THEREOF

(75) Inventors: Won-seok Ahn, Seoul (KR); Jae-seung Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 707 days.

(21) Appl. No.: 11/366,415

(22) Filed: Mar. 3, 2006

(65) Prior Publication Data
US 2006/0233456 A1    Oct. 19, 2006

Related U.S. Application Data

(60) Provisional application No. 60/672,060, filed on Apr. 18, 2005.

(30) Foreign Application Priority Data
Jul. 27, 2005    (KR) .............. 10-2005-0068570

(51) Int. Cl.
 *G06K 9/40* (2006.01)
(52) U.S. Cl. .............. 382/275; 382/264; 382/266
(58) Field of Classification Search .............. 348/597, 348/E5.052, E5.064, E9.042; 359/291; 382/264, 382/266, 275
See application file for complete search history.

(56) References Cited

U.S. PATENT DOCUMENTS

2004/0080517 A1*    4/2004    Song et al. .............. 345/596

FOREIGN PATENT DOCUMENTS

| JP | 2003-15587 A | 1/2003 |
| JP | 2003-157045 A | 5/2003 |
| KR | 2001-0064125 A | 7/2001 |

* cited by examiner

*Primary Examiner*—Andrew W Johns
*Assistant Examiner*—Gregory F Cunningham
(74) *Attorney, Agent, or Firm*—Sughrue Mion, PLLC

(57) ABSTRACT

An apparatus and method for removing a false contour are provided. The apparatus includes a false contour region detector which detects a false contour region formed in a flat region of similar pixel values; an edge and detail region detector which detects an edge region and a detail region of the input image; a detector which detects the flat region by removing the edge region and the detail region of the false contour region; and a smoothing part which smoothes the flat region with the false contour by shuffling the similar pixel values of the flat region with pixels of the detected false contour region. The method includes detecting a false contour region; detecting an edge region and a detail region; detecting a flat region with the false contour; and smoothing the flat region with the false contour by shuffling the similar pixel values.

18 Claims, 6 Drawing Sheets

APPARATUS FOR REMOVING FALSE CONTOUR AND METHOD THEREOF

CROSS-REFERENCE TO RELATED APPLICATION

This application claims priority from U.S. Provisional application No. 60/672,060 filed Apr. 18, 2005 in the U.S. Patent and Trademark Office, and Korean Patent Application No. 10-2005-0068570 filed Jul. 27, 2005 in the Korean Intellectual Property Office. The entire contents of both applications are incorporated herein by reference.

BACKGROUND OF THE INVENTION

1. Field of the Invention

Apparatuses and methods consistent with the present invention relate to removing false contours, and more particularly, to removing false contours by smoothing a flat region with a false contour using shuffling of pixel values.

2. Description of the Related Art

As display devices increase in size in the digital television (DTV) era, artifacts become a huge problem. That is, when images are displayed on a cathode ray tube (CRT) monitor and small television, artifacts are not a problem. However, a large TV screen causes artifact problems. An image input with digital data is processed with contrast enhancement (CE) and detail enhancement (DE) so that an image with more definition can be obtained; however, the side effect of artifacts is generated.

Artifacts are unnatural elements in an image. False contour represents one of the artifacts. False contour is an artifact of the form of contour shown in flat region of an image such as the sky, the surface of the water, or the skin of a human being. All of the pixels of the flat region do not have the same value. Instead, the pixels of the flat region gradually change in brightness value. A differentiation in brightness value in the flat region is perceived by the human eye as a contour line. The contour line in the flat region is called a false contour or false edge as distinct from an edge of a signal element of an image.

There are a variety of causes for generating a false contour. However, when the quantization level generally indicating brightness value is not enough, false contour is generated. The quantization level deciding brightness value depends on a bit depth expressing digitalized brightness value. A false contour is not shown in the existing bit depth but shown in large display device. A false contour is also generated when an image is processed with CE and DE, compressed and restored in accordance with Joint Photographic Experts Group (JPEG) and Moving Picture Experts Group (MPEG) standards. To remove a false contour, the existing methods such as blue noise mask, dithering, and Daly and Feng has been used.

FIG. 1A to FIG. 1C are views showing the existing apparatuses for removing false contour. FIG. 1A is a view describing the existing method of Daly and Feng which removes false contour. The Daly and Feng method models the environment where false contour is generated and performs low pass filtering for the region of false contour that a human eye can recognize well so that false contour is removed. Here, bit depth of input image is P, and bit depth of input image passed through a low pass filter (LPF) 11 is R.

Referring to FIG. 1A, an input image with bit depth of P is input to LPF 11 according to the existing method. The LPF 11 adds peripheral pixels to pixels of input image so that the image smoothes. A bit depth of the input image passed through the LPF 11 increases by the added peripheral pixels. Accordingly, R which is a bit depth of the input image passed through the LPF 11 is more than P which is a bit depth of the input image.

A quantization part 12 re-quantizes a pixel value of the input image which is passed through the LPF 11 and added in bit depth.

A first adding part 13 outputs a difference value between an output value of the LPF 11 and an output value of the quantization part 12.

A second adding part 14 outputs a difference value between an output value of the first adding part 13 and a pixel value of the original image. That is, the second adding part 14 adds a difference between the re-quantized pixel value and the original pixel value to the original image. Therefore, a brightness value of the input image gradually changes so that false contour disappears.

However, the conventional method of removing false contour of Daly and Feng is applied to all of the pixels of the input image. Accordingly, as the entire input image passes through the LPF 11, an edge or texture corresponding to the signal element is blurred so that a degraded output image is obtained.

In addition, the Daly and Feng method can only be applied in a case where a bit depth of input image is less than a bit depth of output image, and where the original image before generating false contour by quantization is known. In addition, when a difference value between a value passed through the LPF 11 and re-quantized value is not enough to remove false contour, false contour can not be removed effectively.

FIG. 1B is a view describing a method for removing false contour generated in quantization process by lowering a bit depth for a certain digital image.

Referring to FIG. 1B, a double bit change detector 21 detects a change of pixel value corresponding to double of halftone information of the quantized digital image and a flat region detector 22 detects a change of peripheral pixels where double bits are detected. A random number generator 23 generates a certain value.

A signal corrector 24 receives a result of the double bit change detector 21, the flat region detector 22 and random number generator 23, and when a double bit change is detected and a peripheral pixel is flat region, the region where double bit change is detected is determined with false contour region. In addition, the signal corrector 24 removes the false contour by adding or subtracting random noise generated in the random number generator 23 to/from the pixel value of false contour.

However, this method can only be applied to a method for removing a false contour generated during a quantization process lowering bit depth so that the environment where quantization artifacts are generated needs to be exactly modeled. Additionally, this method is used for image quality degradation protection generated by a process for data compression by lowering bit depth of digital image so that the applicable field is limited.

FIG. 1C is a view describing a method for removing false contour generated by gamma correction in a plasma display panel (PDP) display. This method selectively performs dithering upon correcting gamma in a PDP display or expressing moving picture in a subfield method so that a false contour shown on flat region and around moving object is prevented.

Referring to FIG. 1C, a gamma and gain adjuster 31 corrects gamma of the input image and an error diffusion and dithering processor 32 dithers using a quantization error caused by correcting gamma. A false contour region detector 33 forecasts a false contour region to be occurred by a subfield method and a selective dithering processor 34 selectively dithers the false contour region.

However, this method removes only a false contour which has occurred by gamma correction on the plasma display panel (PDP) display and is limitedly applied to remove false contour.

Therefore, the above conventional methods of removing false contour can be applied only when the reason why false contour is occurred is known. It is difficult to find the exact false contour, and the false contour can not be effectively removed.

SUMMARY OF THE INVENTION

The present invention provides an apparatus for effectively removing false contour and a method thereof by shuffling a pixel value in a flat region with the detected false contour and smoothing the false contour.

According to an aspect of the present invention, there is provided a apparatus for removing false contour comprising a false contour region detector for detecting a false contour region which is formed in a flat region of similar pixel values in an input image, an edge and detail region detector for detecting an edge region and a detail region of the input image, the detail region having smaller gradation changes than the edge region, a detector for detecting the flat region with the false contour by removing the edge region and the detail region of the detected false contour region, and a smoothing part for smoothing the flat region with the false contour by shuffling the pixel values of the flat region with the detected false contour.

The false contour region detector may determine if a certain region is a flat region of the input image with similar pixel values based on statistical features of the certain region. Additionally, the false contour region detector may detect a region whose entropy is not more than a threshold as the false contour region, based on an entropy of the certain region.

Alternatively, the false contour region detector may detect the false contour region based on the result of comparing the pixel value of the input image with a bit depth set in a device displaying the input image lowered to a bit depth of the input image.

The edge and detail region detector may detect the edge region using at least one of a standard deviation of pixel values of the certain region of the input image and a high pass filtering value.

Additionally, the edge and detail region detector may detect the detail region using at least one of a change of pixel values of the certain region of the input image and a high pass filtering value.

The smoothing part may comprise a delaying part for delaying the input image, and a random shuffling part for storing the input image and the delayed input image by the block and converting a first pixel value of a block of the flat region having the detected false contour to a second pixel value of the block.

Additionally, the smoothing part may further comprise a random number generator for determining a location of the second pixel value.

Further, the smoothing part may further comprise a low pass filter for low-pass filtering the output of the random shuffling part.

According to another aspect of the present invention, there is provided a method of removing false contour comprising detecting a false contour region which is formed in a flat region of similar pixel values in an input image, detecting an edge region and a detail region of the input image, the detail region having smaller gradation changes than the edge region, detecting a flat region with the false contour by removing the edge region and the detail region of the detected false contour region, and smoothing the flat region with the false contour by shuffling the pixel values of the flat region with the detected false contour.

The detecting the false contour region may further comprise determining if a certain region of the input image is a flat region of a certain pixel value based on statistical features of the certain region.

The detecting the false contour region may further comprise detecting a region whose entropy is not more than a threshold as the false contour region, based on an entropy of the certain region.

Alternatively, the detecting the false contour region may further comprise detecting the false contour region based on the result of comparing the pixel value of the input image with a bit depth set in a device displaying the input image lowered to a bit depth of the input image.

The detecting the edge and detail region may further comprise detecting the edge region using at least one of a standard deviation of pixel values of the certain region of the input image and a high pass filtering value.

Further, the detecting the edge and detail region may further comprise detecting the detail region using one of a change of pixel values of the certain region of the input image and a high pass filtering value.

The smoothing the flat region may comprise delaying the input image, and storing the input image and the delayed input image by the block and converting a first pixel value of a block of the flat region having the detected false contour to a second pixel value of the block.

Further, the smoothing the flat region may further comprise the step of generating a random determining a location of the second pixel value.

Additionally, the smoothing the flat region may further comprise low-pass filtering the block whose pixel value is converted.

BRIEF DESCRIPTION OF THE DRAWING FIGURES

The above and other aspects of the present invention will become more apparent by describing in detail exemplary embodiments thereof with reference to the attached drawing figures, wherein.

DETAILED DESCRIPTION OF EXEMPLARY EMBODIMENTS OF THE INVENTION

Figure 1A:
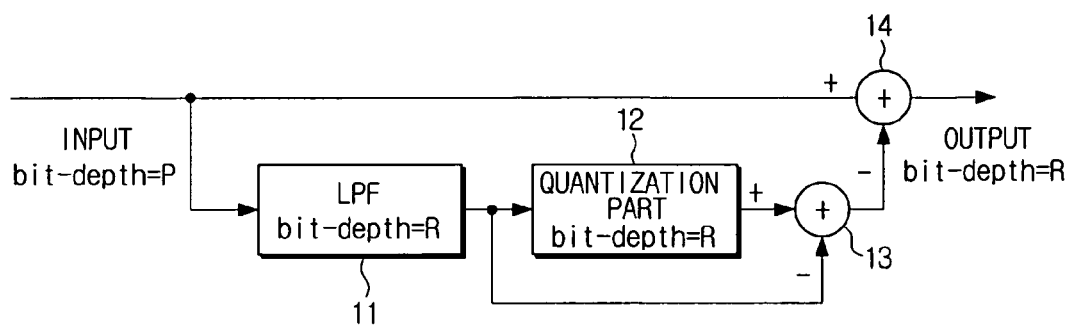
FIGS. 1A to 1C are views showing conventional apparatuses for removing false contour.
Figure 1B:
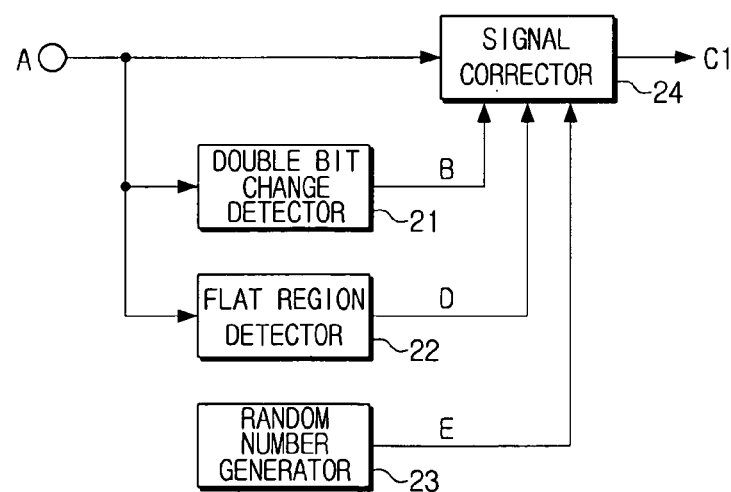
Figure 1C:
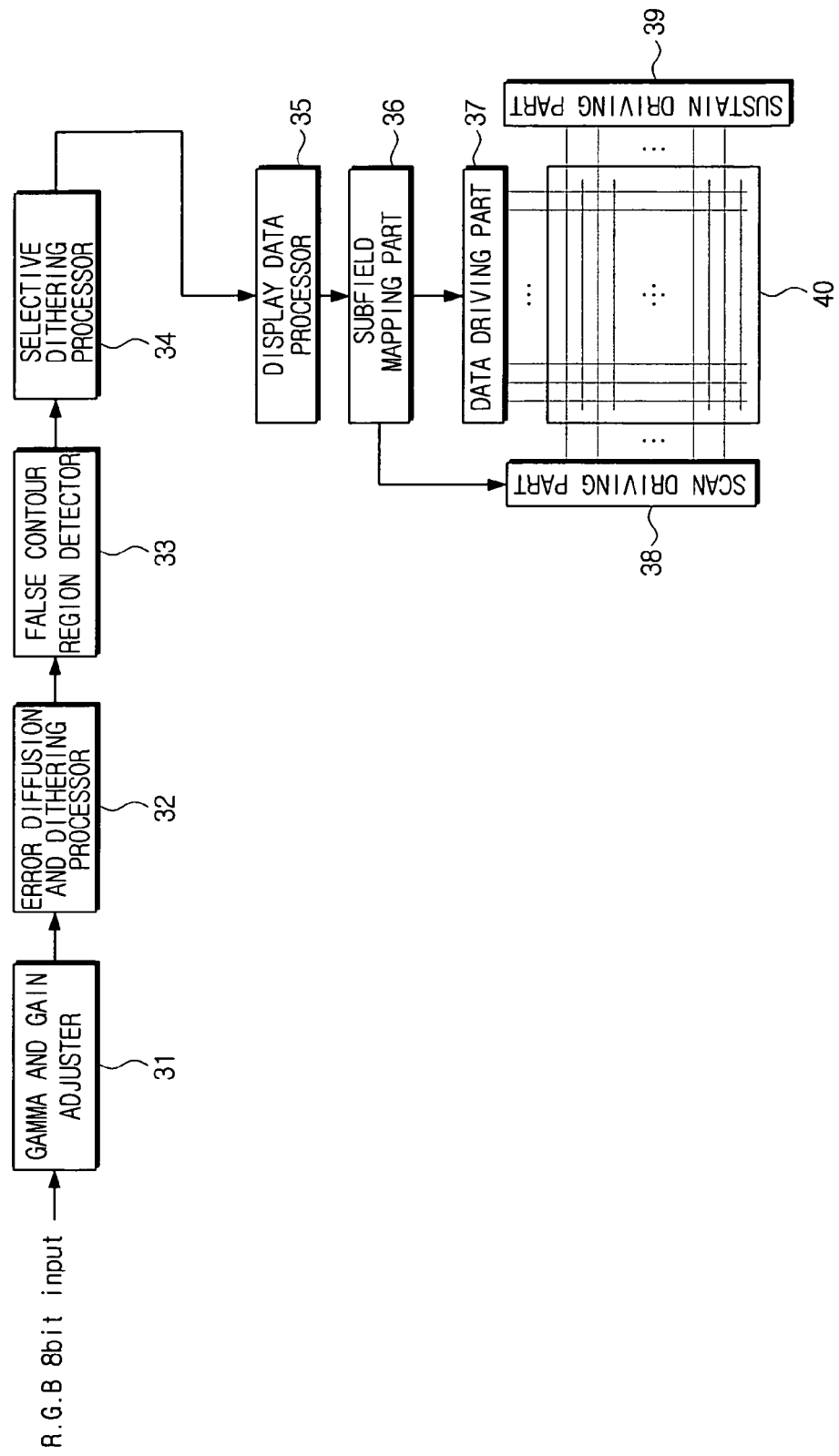

Hereinafter, exemplary embodiments of the present invention will be described in detail with reference to the accompanying drawing figures.

In the following description, same drawing reference numerals are used for the same elements even in different drawings. The matters defined in the description such as a detailed construction and elements are provided to assist one having skill in the art in a comprehensive understanding of the invention. Thus, it is apparent that the present invention can be carried out without those defined matters. Also, well-known functions or constructions are not described in detail since they would obscure the invention in unnecessary detail.

Figure 2:
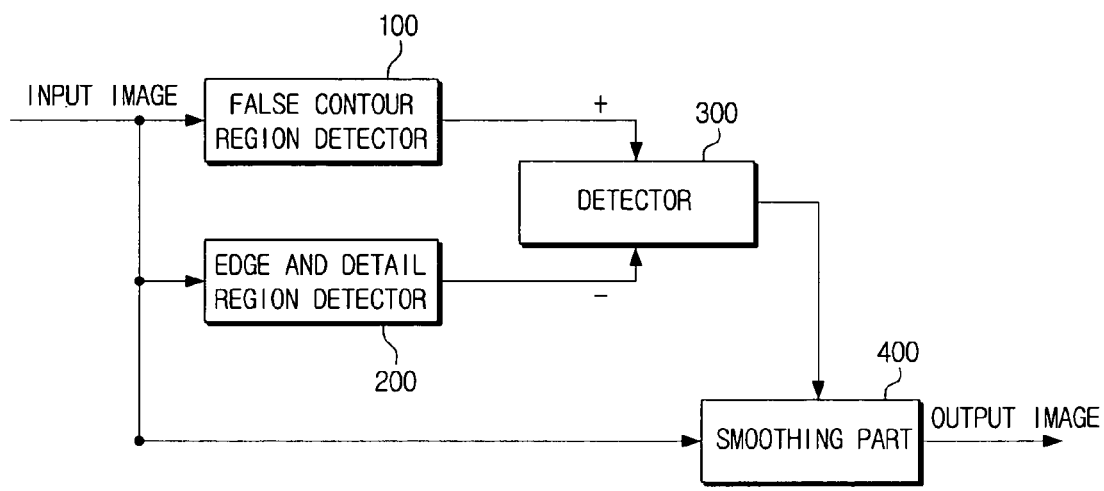
FIG. 2 is a block diagram showing an apparatus for removing false contour according to an exemplary embodiment of the present invention.

FIG. 2 is a block diagram showing an apparatus for removing false contour according to an exemplary embodiment of the present invention.

Referring to FIG. 2, the apparatus for removing false contour according to an exemplary embodiment of the present invention includes a false contour region detector 100, an edge and detail region detector 200, a detector 300 and a smoothing part 400.

The false contour region detector 100 detects a false contour region by detecting a region where a bit depth misses or can miss. A false contour region is detected using statistic features of pixels located in a certain region of an input image based on the current pixels.

Specifically, the false contour region detector 100 calculates a distribution of a histogram of pixel values of the certain region and detects the false contour region using an entropy value calculated based on a probability that a particular value exists in the certain region. If the entropy value is less than a predetermined threshold, the certain region can be detected as a flat region with a similar pixel value to an adjacent region and a false contour region without gradation.

Additionally, the false contour region can be also detected based on a quantization expectation value for the input image and a practical pixel value of the input image. If energy for a difference between the quantization expectation value for the input image and the practical pixel value of the input image is less than a predetermined threshold, the input image can be the false contour region.

The edge and detail region detector 200 detects an edge region having a large gradation change in the input image and a detail region having a smaller gradation change than the edge region. The edge and detail region detector 200 detects the edge region using at least one of a standard deviation of pixel values of the certain region of the input image and a high filtering value. The standard deviation of pixel values of the certain region is over a predetermined threshold, and a central pixel of the certain region can be detected as the edge region. In addition, after the certain region of the input image is filtered through a high pass filter, a pixel with a maximum filtering value can be detected as an edge region. The high pass filter may be a canny edge filter, a sobel edge filter or other filter known in the art.

Also, the edge and detail region detector 200 detects the detail region using at least one of a change of pixel values of the high pass filter and the certain region of the input image. If the sum of the energy of the certain region of the input image passed through the high pass filter is over a predetermined threshold, the certain region is detected as the detail region. Or, when a signal of the certain region of the input image or the high-pass-filtered signal changes positive to negative or negative to positive, the change is calculated so that the detail region can be detected.

The detector 300 detects a flat region with a false contour using the detected result of the false contour region detector 100 and the edge and detail region detector 200. The flat region with false contour can be detected by removing the edge and detail region detected from the edge and detail region detector 200 from the region with false contour detected from the false contour region detector 100.

The smoothing part 400 removes the false contour by shuffling pixel values of the flat region with the false contour. The pixel value detected as the false contour is replaced with a pixel value with a certain address value, or two pixel values with certain address values in the false contour region exchange with each other so that the pixel values of the flat region with false contour are shuffled.

Figure 3:
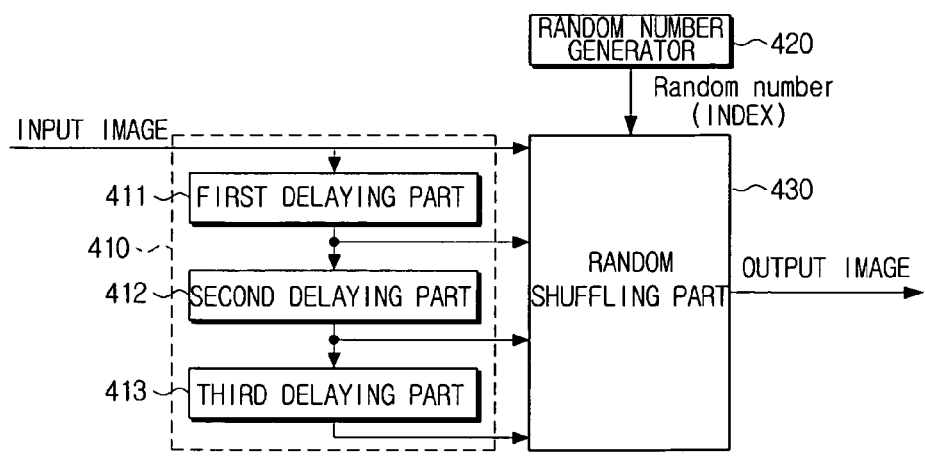
FIG. 3 is a view illustrating an exemplary embodiment of a smoothing part in FIG. 2.
Figure 4:
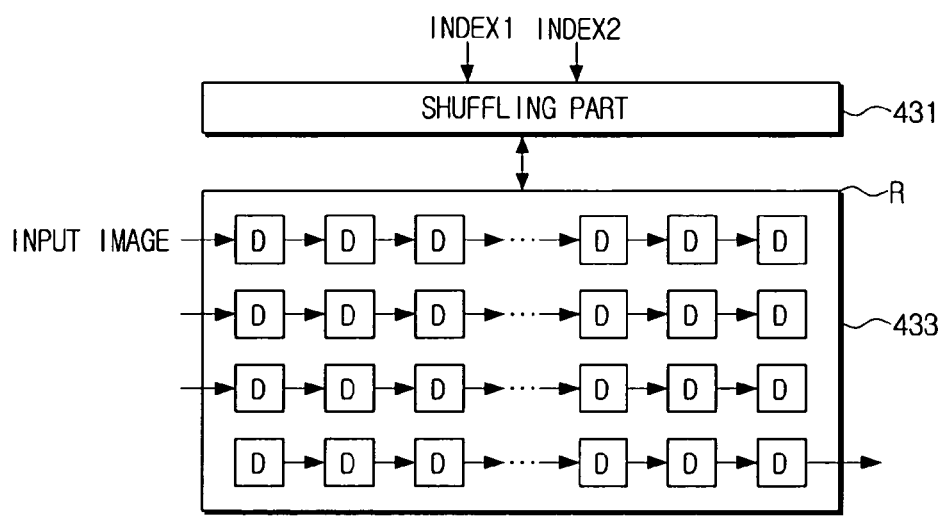
FIG. 4 is a detailed view illustrating operation of a random shuffling part of the smoothing part in FIG. 3.

FIG. 3 is a view describing an exemplary embodiment of the smoothing part in FIG. 2. FIG. 4 is a detailed view describing operation of a random shuffling part 430 of the smoothing part in FIG. 3. R denotes a block stored in a shuffling memory 433 of the shuffled input image.

Referring to FIG. 3 and FIG. 4, the smoothing part 400 includes a delaying part 410, a random number generator 420 and a random shuffling part 430. The delaying part 410 includes a first delaying part 411, a second delaying part 412 and a third delaying part 413 to delay and output the input image. The random number generator 420 generates a certain positive number in a range of the address value of the shuffling memory 433 included in the random shuffling part 430.

The random shuffling part 430 includes the shuffling memory 433 and a shuffling part 431 and removes a false contour by shuffling pixel value of a region with false contour. The shuffling memory 433 receives the input image and the input image delayed in the first, second and third delaying part 411, 412, 413 and stores the input images by the block.

A shuffling part 431 shuffles pixel value of a flat region with false contour based on an address value of a certain shuffling memory 433 generated in the random number generator 420. The shuffling part 431 receives the address value of the certain shuffling memory 433 generated in the random number generator 420, reads a pixel value corresponding to the address value and exchanges the preset pixel value with the pixel value corresponding to the received address value so that the pixel values of the block can be shuffled. The preset pixel value can be a central pixel of the shuffled region, that is, of the block R of the stored input image.

Alternatively, when the address value of two certain shuffling memory 433 are input from the random number generator 420, the shuffling part 431 exchanges the address values with other pixel values corresponding to the input address values in order to shuffle the pixel values of the block so that false contour can be removed. Additionally, the random shuffling part 430 performs shuffling one or more times so that smoothing can be maximized.

Figure 5A:
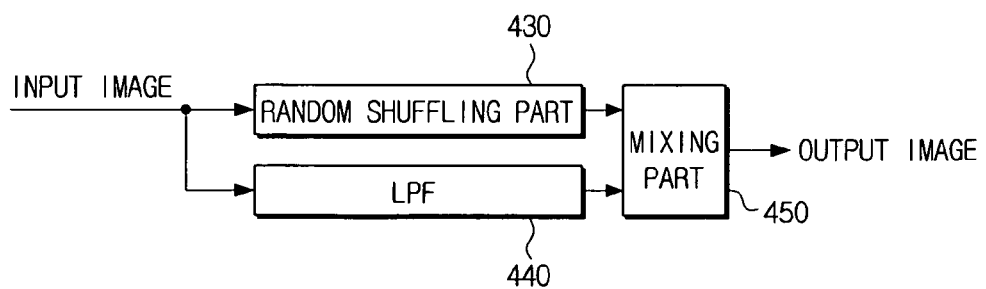
FIGS. 5A and 5B is views illustrating another exemplary embodiment of the smoothing part in FIG. 2.
Figure 5B:
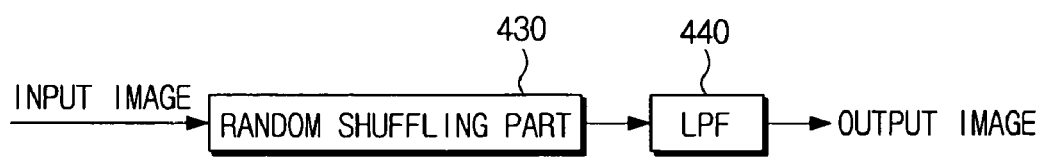

FIGS. 5A and 5B are views describing another exemplary embodiment of the smoothing part 400 in FIG. 2. Unlike the smoothing part 400 in FIG. 4, the smoothing part 400 in FIG. 5 includes a low-pass filter (LPF) 440 and a mixing part 450. The operation of the random shuffling part 430 of the smoothing part 400 shown in FIGS. 5A and 5B is the same as that described in FIGS. 3 and 4 above.

Referring to FIG. 5A, the LPF 440 filters a flat region with false contour and removes the false contour in order for the pixel values in filtered blocks to have a similar pixel value. The mixing part 450 sets a weight for output values respectively from the random shuffling part 430 and the LPF 440 and mixes the output values so that an image of flat region without false contour is output.

Referring to FIG. 5B, the smoothing part 400 does not output the image by mixing the output values from the random shuffling part 430 and the LPF 440 as shown in FIG. 5A, but removes false contour by low-pass filtering the input image shuffled by the block again.

Figure 6:
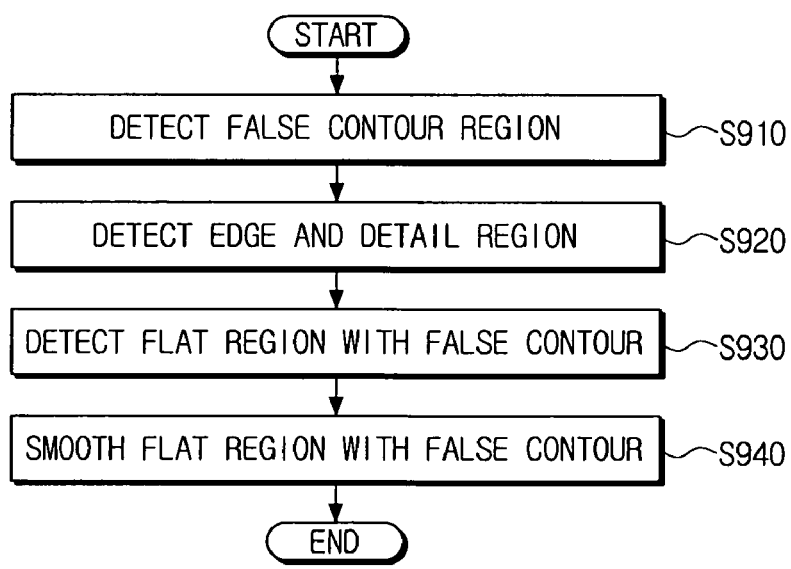
FIG. 6 is a flow chart illustrating a method of removing false contour according to an exemplary embodiment of the present invention.

FIG. 6 is a flow chart describing a method of removing a false contour according to another exemplary embodiment of the present invention Referring to FIG. 6, a false contour region of an input image is detected (S910). The false contour region is detected by detecting a region of the input image where a bit depth misses or can miss. Whether there is a false contour region is detected using statistic features of pixels located in a certain region of the input image based on the current pixels.

Specifically, after calculating a distribution of a histogram of pixel values of the certain region, the false contour region is detected using an entropy value calculated based on a probability that a particular value exists in the certain region. The entropy value ($\epsilon$) is calculated according to Equation 1.

$$\varepsilon = -\sum_y p_y \log_2 p_y \qquad \text{[Equation 1]}$$

Herein, $\epsilon$ denotes an entropy value in a certain region, y denotes a certain pixel in the certain region and $p_y$ denotes a probability that a particular pixel value exists in the certain region If the entropy value according to Equation 1 is less than a predetermined threshold, the certain region can be detected as a flat region having a similar pixel value to an adjacent region and to be a false contour region without gradation.

Additionally, the false contour region can be also detected based on a quantization expectation value, which a bit depth of the input image is lowered, and a practical pixel value of input image. If energy for a difference between the quantization expectation value and the practical pixel value of the input image is less than the predetermined threshold, the input image is detected as the false contour region.

Subsequently, an edge region and a detail region of the input image are detected (S920). The edge region has a large gradation change and the detail region has smaller gradation change than the edge region. To exactly detect a flat region with a false contour, not the flat region but the edge and detail region is detected.

The edge region is detected using at least one of a standard deviation of pixel values of the certain region in the input image and a high pass filtering value of a high pass filter. That is, the standard deviation of pixel values of the certain region is not less than a predetermined threshold, and a central pixel of the certain region can be determined as the edge region.

Additionally, after the certain region of the input image is filtered through a high pass filter, a pixel with a maximum filtering value can be detected as an edge region. The high pass filter may be a canny edge filter, a sobel edge filter or other filter known in the art. Therefore, the edge region is detected by detecting a pixel whose standard deviation is not less than the threshold value or a pixel with a maximum filtering value, or by mixing a standard deviation and a maximum filtering value.

Also, the detail region can be detected using at least one of a change of pixel values of the high pass filter and the certain region of the input image. If the sum of the energy of the certain region of the input image passed through the high pass filter is not less than a predetermined threshold, the certain region is detected as the detail region. Unlike the edge region, though, there exists no region whose high pass filtering value is a maximum value, when the sum of the energy of the filtered certain region is not less than the threshold value, the certain region is determined as not a flat region but a detail region.

Alternatively, when a signal of the certain region of the input image or the high-pass-filtered signal changes positive to negative or negative to positive, the changing amount or the number of the changes is calculated so that the detail region can be detected. That is, a peak point where a signal changes in a certain region can be determined as a detail region.

Next, a flat region with false contour is detected (S930). The flat region with false contour can be detected by removing the edge and detail region detected in operation S920 from the false contour region detected in operation S910.

Figure 7:
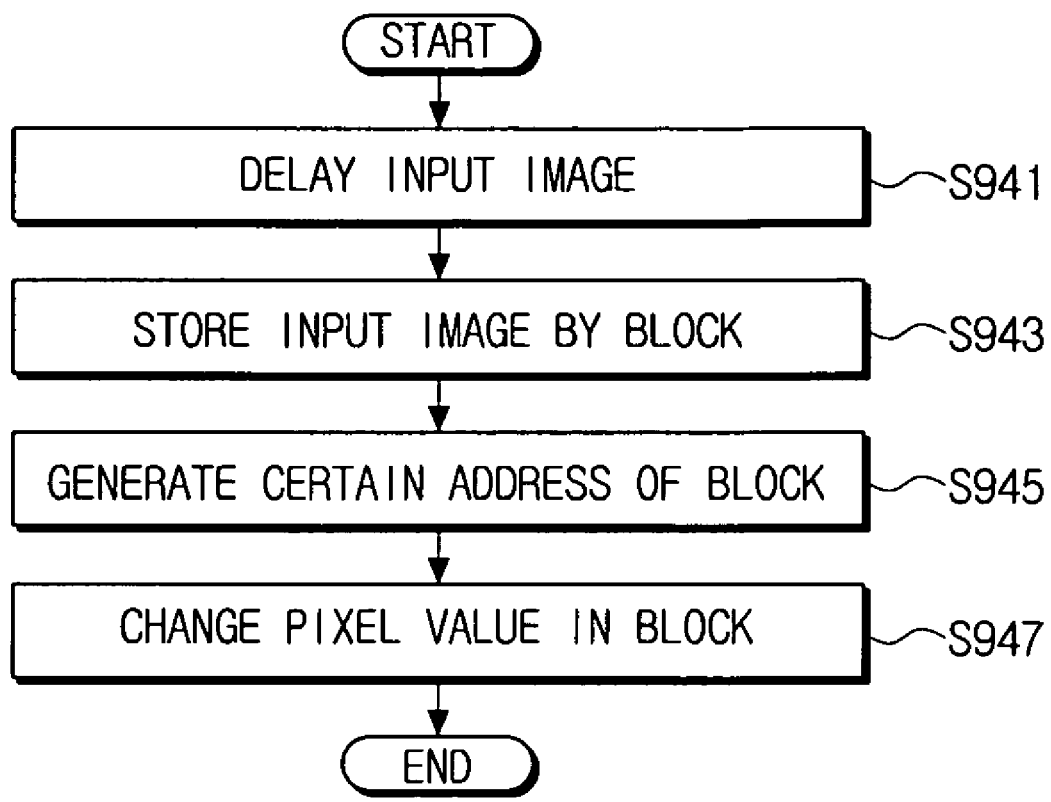
FIG. 7 is a detailed flow chart illustrating a process of smoothing a flat region with false contour in FIG. 6.

The flat region with false contour is smoothed to remove false contour (S940). FIG. 7 is a detailed flow chart describing a process of smoothing a flat region with a false contour.

Referring to FIG. 7, the input image is delayed (S941). The input image can be delayed line by line using a plurality of delaying parts.

Subsequently, the input images are stored by the block (S943). To remove a false contour by the block in the flat region with false contour, the input image and the delayed input images are stored by the block.

Next, a certain positive number corresponding to an address value in a block is generated (S945). A certain positive number corresponding to an address where a pixel is stored is generated using a random function or the like. The number of generated certain positive number is one or more.

Next, the false contour formed in the flat region of the input image is removed by shuffling which changes a pixel value in a block (S947).

A pixel value of a flat region with false contour is shuffled based on the generated address value. If the number of the generated certain positive number is one, a certain address value in a block is received, a pixel value corresponding to the address value is read, and the preset pixel value is exchanged with the pixel value corresponding to the received address value. Thus, the pixel values of the block can be shuffled. The preset pixel value can be a central pixel of the shuffled region, that is, of the block of the stored input image.

Alternatively, where two certain positive numbers are generated, the pixel values corresponding to the input address values are exchanged with each other. By exchanging the pixel values, the pixel values of the block are shuffled so that the false contour can be removed. Additionally, shuffling may be performed more than once so that smoothing can be maximized.

The false contour is removed in a flat region with false contour by shuffling pixel values of the block and also low-pass-filtering can be used together. The false contour is removed by giving weight to the result after low-pass-filtering pixel values of the block and the result of shuffling, respectively. Alternatively, the false contour is removed by low-pass-filtering the shuffled result after shuffling pixel values of the block.

As can be appreciated from the above description, a false contour region is exactly detected from an input image and smoothes regardless of the cause of the false contour according to the present invention.

Additionally, false contour can be effectively removed by not only shuffling a detected false contour region but also by low-pass-filtering.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A false contour region detection apparatus for removing a false contour, the apparatus comprising:
   a false contour region detector that detects a false contour region which is formed in a flat region of similar pixel values in an input image;
   an edge and detail region detector that detects an edge region and a detail region of the input image, the detail region having smaller gradation changes than the edge region;
   a detector that detects the flat region with the false contour by removing the edge region and the detail region of the false contour region; and
   a smoothing part that smooths the flat region with the false contour by shuffling the similar pixel values of the flat region with pixels of the false contour region.

2. The false contour region detection apparatus of claim 1, wherein the false contour region detector determines if a certain region is a flat region with similar pixel values based on statistical features of the certain region of the input image.

3. The false contour region detection apparatus of claim 2, wherein the false contour region detector detects a region whose entropy is not more than a threshold as the false contour region, based on an entropy of the certain region.

4. The false contour region detection apparatus of claim 2, wherein the false contour region detector detects the false contour region based on a result of comparing one of the similar pixel values of the input image with a bit depth set in a device displaying the input image lowered to a bit depth of the input image.

5. The false contour region detection apparatus of claim 1, wherein the edge and detail region detector detects the edge region using at least one of a standard deviation of pixel values of a certain region of the input image and a high pass filtering value.

6. The false contour region detection apparatus of claim 1, wherein the edge and detail region detector detects the detail region using at least one of a change of pixel values of a certain region of the input image and a high pass filtering value.

7. The false contour region detection apparatus of claim 1, wherein the smoothing part comprises:
   a delaying part that delays the input image; and
   a random shuffling part that stores the input image and the delayed input image in units of blocks and that stores a first pixel value of a block of the flat region having the detected false contour to a second pixel value of the block.

8. The false contour region detection apparatus of claim 7, wherein the smoothing part further comprises a random number generator that determines a location of the second pixel value.

9. The false contour region detection apparatus of claim 7, wherein the smoothing part further comprises a low pass filter that low-pass filters an output from the random shuffling part.

10. A method of removing false contour, the method comprising:
    using a processor to carry out the steps of:
       detecting a false contour region which is formed in a flat region of similar pixel values in an input image;
       detecting an edge region and a detail region of the input image, the detail region having smaller gradation changes than the edge region;
       detecting a flat region with the false contour by removing the edge region and the detail region of the false contour region; and
       smoothing the flat region with the false contour by shuffling the similar pixel values of the flat region with pixels from the false contour region.

11. The method of claim 10, wherein the detecting the false contour region comprises determining if a certain region of the input image is a flat region of a certain pixel value based on statistical features of the certain region.

12. The method of claim 11, wherein the detecting the false contour region further comprises determining a region whose entropy is not more than a threshold as the false contour region, based on an entropy of the certain region.

13. The method of claim 11, wherein the detecting the false contour region further comprises detecting the false contour region based on a result of comparing one of the similar pixel values of the input image with a bit depth set in a device displaying the input image lowered to a bit depth of the input image.

14. The method of claim 10, wherein the detecting the edge and detail region comprises detecting the edge region using at least one of a standard deviation of pixel values of a certain region of the input image and a high filtering value.

15. The method of claim 10, wherein the detecting the edge and detail region comprises detecting the detail region using one of a change of pixel values of a certain region of the input image and a high filtering value.

16. The method of claim 10, wherein the smoothing the flat region comprises:
    delaying the input image; and
    storing the input image and the delayed input image in units of blocks and converting a first pixel value of a block of the flat region having the detected false contour to a second pixel value of the block.

17. The method of claim 16, wherein the smoothing the flat region further comprises determining a location of the second pixel value.

18. The method of claim 16, wherein the smoothing the flat region further comprises low-pass filtering the block whose pixel value is converted.

* * * * *

UNITED STATES PATENT AND TRADEMARK OFFICE
CERTIFICATE OF CORRECTION

PATENT NO. : 7,660,484 B2  Page 1 of 1
APPLICATION NO. : 11/366415
DATED : February 9, 2010
INVENTOR(S) : Ahn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1013 days.

Signed and Sealed this

Twenty-eighth Day of December, 2010

David J. Kappos
*Director of the United States Patent and Trademark Office*